United States Patent
Beckwith (10) Patent No.: US 9,453,733 B2
(45) Date of Patent: Sep. 27, 2016

(54) DEVICES AND METHODS FOR A PATH LENGTH CONTROL DRIVER FOR A RING LASER GYROSCOPE

(71) Applicant: Honeywell International Inc., Morristown, NJ (US)

(72) Inventor: Timothy A. Beckwith, Coon Rapids, MN (US)

(73) Assignee: Honeywell International Inc., Morris Plains, NJ (US)

( * ) Notice: Subject to any disclaimer, the term of this patent is extended or adjusted under 35 U.S.C. 154(b) by 131 days.

(21) Appl. No.: 14/329,630

(22) Filed: Jul. 11, 2014

(65) Prior Publication Data
US 2016/0010996 A1    Jan. 14, 2016

(51) Int. Cl.
*H01L 41/09* (2006.01)
*H05K 1/00* (2006.01)
*G01C 19/66* (2006.01)

(52) U.S. Cl.
CPC ............ *G01C 19/66* (2013.01); *G01C 19/665* (2013.01)

(58) Field of Classification Search
CPC ..................................................... H04R 17/00
USPC ...... 310/328, 330, 332, 366; 439/44, 60, 67, 439/77
See application file for complete search history.

(56) References Cited

U.S. PATENT DOCUMENTS

| 5,148,076 | A | 9/1992 | Albers et al. | |
|---|---|---|---|---|
| 5,162,870 | A | 11/1992 | Toth | |
| 5,815,466 | A * | 9/1998 | Erath | G01H 11/08 310/331 |
| 2004/0119379 | A1 * | 6/2004 | Lee | H01L 41/094 310/365 |
| 2008/0079948 | A1 | 4/2008 | Beckwith et al. | |
| 2011/0006645 | A1 * | 1/2011 | Chen | H01L 41/0474 310/366 |
| 2013/0094681 | A1 * | 4/2013 | Fukuoka | H04R 17/00 381/190 |
| 2014/0215785 | A1 * | 8/2014 | Weston | B60C 23/0411 29/25.35 |
| 2016/0114354 | A1 * | 4/2016 | Chang | B06B 1/0603 367/31 |
| 2016/0134204 | A1 * | 5/2016 | Al Ahmad | H02N 2/183 310/319 |

FOREIGN PATENT DOCUMENTS

EP     0508391     10/1992

OTHER PUBLICATIONS

European Patent Office, "Extended European Search Report from EP Application No. 15172447.3 mailed Nov. 17, 2015", "from Foreign Counterpart of U.S. Appl. No. 14/329,630", Nov. 17, 2015, pp. 1-7, Published in: EP.

* cited by examiner

*Primary Examiner* — Thomas Dougherty
(74) *Attorney, Agent, or Firm* — Fogg & Powers LLC (57) ABSTRACT

A path length control (PLC) driver of a ring laser gyroscope includes a first piezoelectric assembly including a first piezoelectric element, a second piezoelectric element, and a first electrode. The PLC driver further includes a second piezoelectric assembly including a third piezoelectric element, a fourth piezoelectric element, and a second electrode. The PLC driver further includes a baseplate positioned between the first piezoelectric assembly and the second piezoelectric assembly, including a pin extending through the first piezoelectric assembly. The PLC driver further includes a flexible coupling assembly that electrically couples the first electrode to a first wire harness connection point, the second electrode to a second wire harness connection point, and the pin to a third wire harness connection point. The flexible coupling assembly is bonded to a negative polarity side of the first piezoelectric element by a semi-rigid conductive adhesive.

14 Claims, 6 Drawing Sheets

DEVICES AND METHODS FOR A PATH LENGTH CONTROL DRIVER FOR A RING LASER GYROSCOPE

BACKGROUND

A ring laser gyroscope includes a path length control (PLC) driver, a laser block assembly, and a transducer mirror. A PLC driver includes a baseplate, piezoelectric (piezo) elements, and conductive elements. For ring laser gyroscopes, electrical connection between the wiring harness and the top piezo of the PLC driver is critical to performance. Existing ring laser gyroscopes establish this connection through the use of wires and a conductive epoxy. During operation, the top piezo will deform depending on variation in temperature and applied voltage. The use of a conductive epoxy has been shown to fracture the top piezo during thermal cycling of existing ring laser gyroscopes. This fracturing will degrade the PLC driver performance possibly to the point of failure.

For the reasons stated above and for other reasons stated below which will become apparent to those skilled in the art upon reading and understanding the specification, there is a need in the art for improved systems and methods for maintaining the electrical connection between the wiring harness and the top piezo during thermal cycling without fracturing the top piezo.

SUMMARY

The Embodiments of the present invention provide methods and systems for a path length control driver for a ring laser gyroscope and will be understood by reading and studying the following specification.

In one embodiment, a path length control driver of a ring laser gyroscope comprises: a first piezoelectric assembly, wherein the first piezoelectric element assembly includes a first piezoelectric element, a second piezoelectric element, and a first electrode electrically coupled to a positive polarity side of the first piezoelectric element and the second piezoelectric element; a second piezoelectric assembly, wherein the second piezoelectric assembly includes a third piezoelectric element, a fourth piezoelectric element, and a second electrode electrically coupled to a positive polarity side of the third piezoelectric element and the fourth piezoelectric element; a baseplate positioned between the first piezoelectric assembly and the second piezoelectric assembly, the baseplate including a pin extending through the first piezoelectric assembly; and a flexible coupling assembly that electrically couples the first electrode to a first wire harness connection point, electrically couples the second electrode to a second wire harness connection point, and electrically couples the pin to a third wire harness connection point; wherein the flexible coupling assembly is bonded to a negative polarity side of the first piezoelectric element of the first piezoelectric assembly by a semi-rigid conductive adhesive that electrically couples the negative polarity side of the first piezoelectric element to the pin.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for electrically coupling a PLC driver to a wiring harness via a flexible coupling assembly that is secured to the upper piezoelectric (piezo) of the PLC driver using a semi-rigid conductive adhesive. As will be illustrated in more detail below, a plurality of conductive pads located on the coupling assembly are secured to the upper piezo by the semi-rigid conductive adhesive. A conductive layer within the flexible coupling assembly provides electrical traces which connect the conductive pads to the wiring harness and/or other elements of the PLC driver.

Figure 1A:
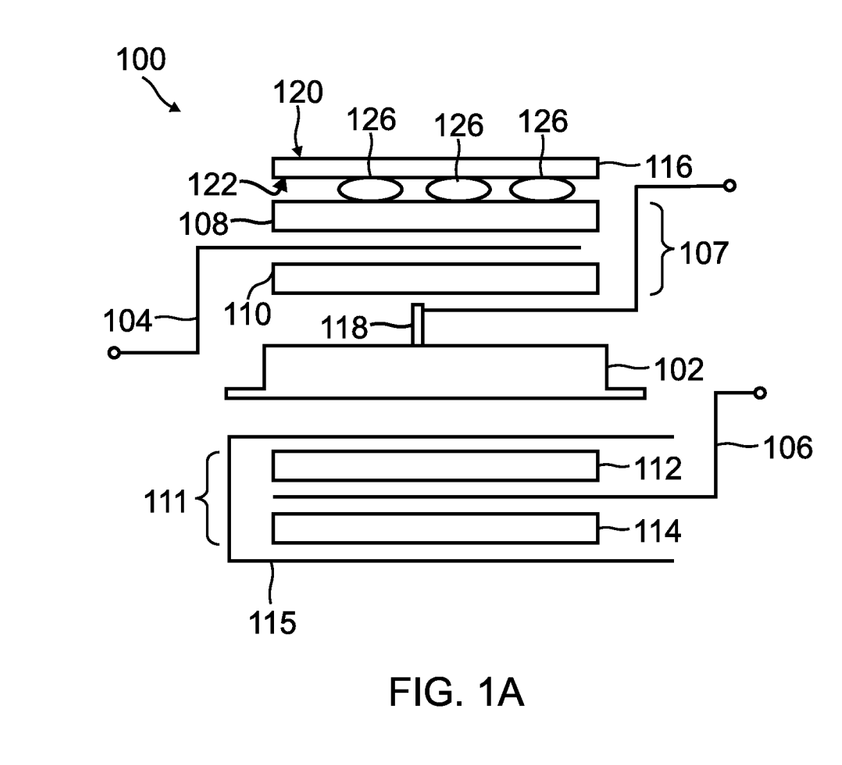
FIGS. 1A and 1B illustrate an example PLC driver having a flexible coupling assembly of one embodiment of the present disclosure.
Figure 1B:
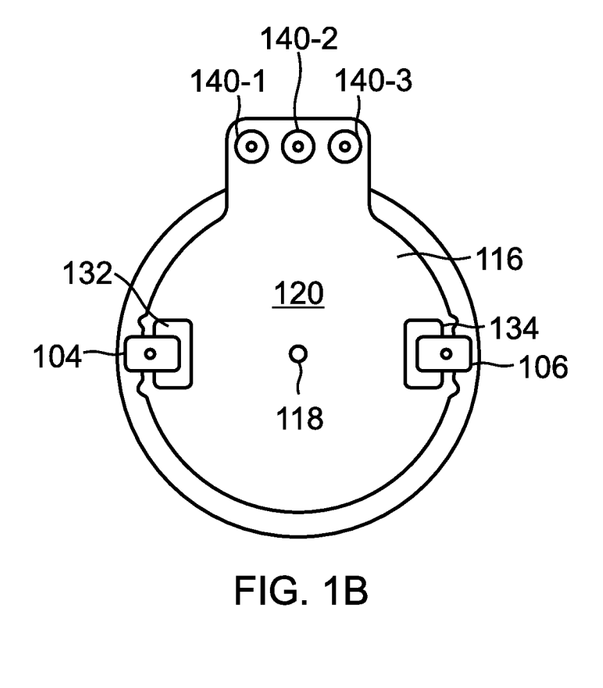

FIGS. 1A and 1B illustrate an example PLC driver 100 having a flexible coupling assembly 116 of one embodiment of the present disclosure. More specifically, FIG. 1A is an exploded cross-sectional diagram illustrating PLC driver 100. As shown in FIG. 1A, PLC driver 100 comprises an upper piezo assembly 107 which includes piezo 108 and 110, and a lower piezo assembly 111 which includes piezos 112 and 114. A first electrode 104 provides an electrical connection for the positive polarity side of piezos 108 and 110, while a second electrode 106 provides an electrical connection to the positive polarity side of piezos 112 and 114. The upper piezo assembly 107 and the lower piezo assembly 111 are separated by baseplate 102, which is electrically and mechanically coupled to the negative polarity side of piezo 110 and piezo 112 and electrically coupled to the negative polarity side of piezo 114 (shown by connection 115). An electrical connection to baseplate 102 is provided by pin 118, which penetrates through the center of upper piezo assembly 107. In some embodiments, one or more of electrodes 104, 106, 115 and pin 118 may be plated to enhance conductivity with material comprising, but not limited to, beryllium copper.

Flexible coupling assembly 116 includes a first side 120 (which may be considered the "top" side) and a second side 122 (which may be considered the "back side"). As shown in FIG. 1A, the back side 122 of flexible coupling assembly 116 is secured to the negative side of piezo 108 using a semi-rigid conductive adhesive 126. More specifically, semi-rigid conductive adhesive 126 is applied to a plurality of backside conductive pads, electrically coupling one or more electrical traces within flexible coupling assembly 116 to the negative side of piezo 108 (discussed in greater detail below).

FIG. 1B illustrates a top view of PLC driver 100 looking down on flexible coupling assembly 116. The electrodes 104, 106 are shown in this figure to extend to the top side 120 of flexible coupling assembly 116 and are folded over to make electrical contact with respective top side conductive pads 132 and 134. In some embodiments, electrodes 104 and 106 are soldered to the conductive pads 132, 134 to ensure that electrical coupling is maintained. Also, as shown in FIG. 1B, pin 118 extends through the flexible coupling assembly 116. As discussed below, pin 118 is soldered to a copper pad located on the top of flexible coupling assembly 116. Additionally, flexible coupling assembly 116 comprises a plurality of wire harness connection points (shown at 140-1, 140-2 and 140-3) which facilitate connection of a wiring harness to PLC driver 100.

Figure 2A:
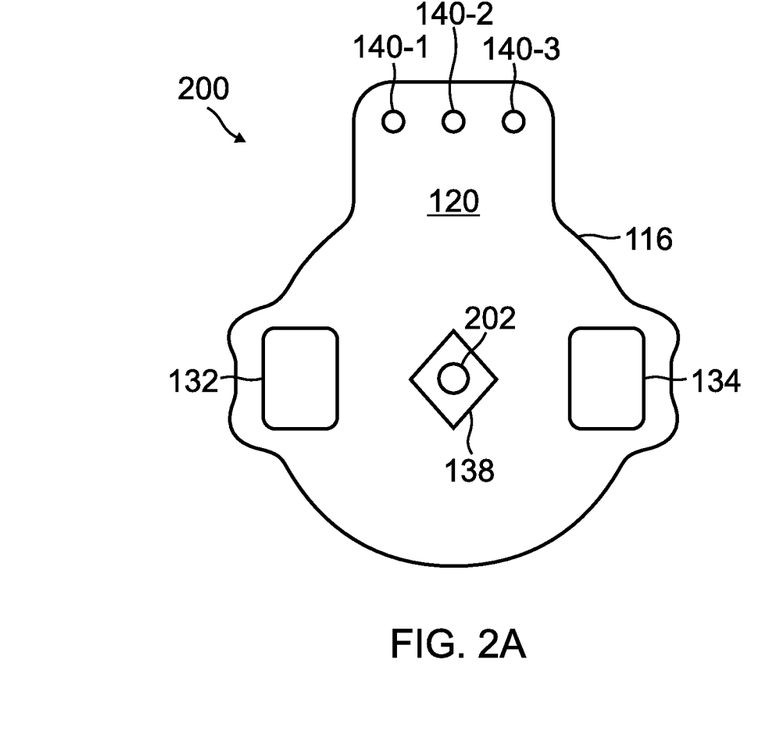
FIGS. 2A to 2C are diagrams illustrating a flexible coupling assembly of one embodiment of the present disclosure.
Figure 2B:
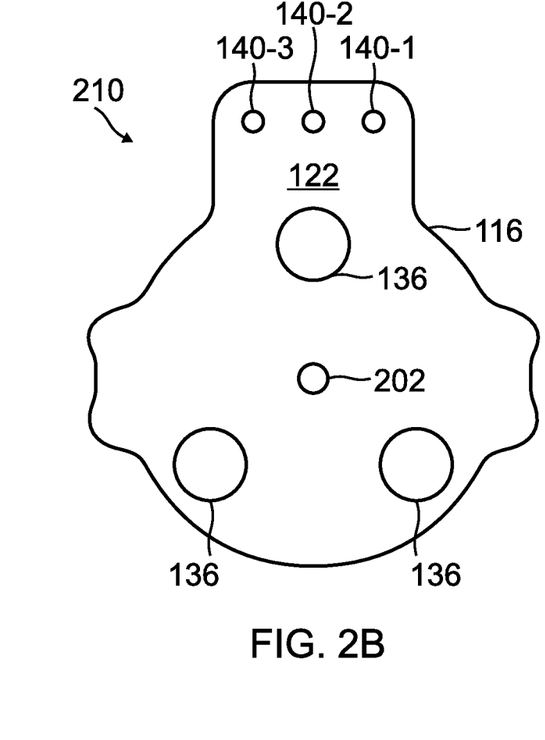
Figure 2C:
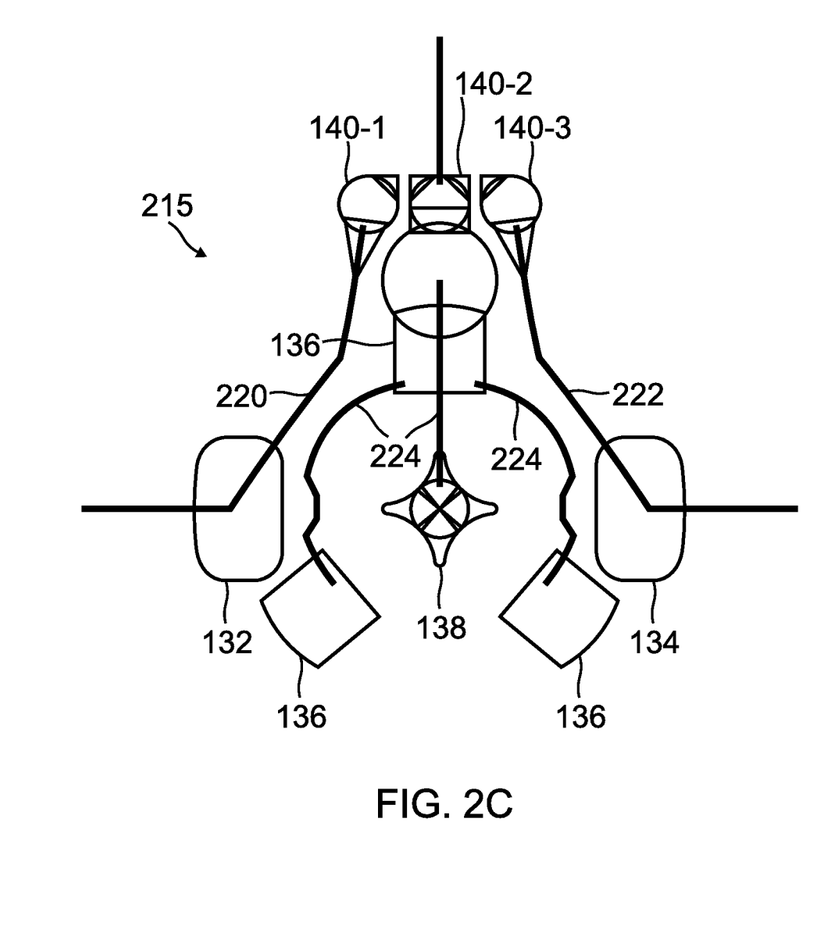

FIGS. 2A to 2C are diagrams providing additional illustrations of flexible coupling assembly 116. FIG. 2A, generally at 200 illustrates a top view of flexible coupling assembly 116 (i.e., looking at first side 120). In this embodiment, flexible coupling assembly 116 is predominantly circular, effectively covering the negative side of piezo 108. A center hole 202 is provided to allow pin 118 to extend through flexible coupling assembly 116 as shown in FIG. 1B. The top side conductive pads 132 and 134 are positioned as shown, proximate to the perimeter of flexible coupling assembly 116 and located so that they can be readily reached by electrodes 104 and 106. Conductive pad 138 provides the electrically conductive surface to which pin 118 is soldered from the top side 120 of flexible coupling assembly 116.

FIG. 2B, generally at 210 shows a bottom view of flexible coupling assembly 116 (i.e., looking at second side 122). FIG. 2B illustrates a plurality of backside conductive pads 136, each of which is secured to the negative side of piezo 108 using the semi-rigid conductive adhesive 126. Conductive pads 136 are spaced apart to provide electrical contact with top piezo 108 at multiple points. This configuration prevents the loss of electrical contact if one of the conductive pads 136 fails or peels off.

FIG. 2C provides an electrical schematic diagram 215 for flexible coupling assembly 116. A first conductive trace 220 within flexible coupling assembly 116 electrically connects wire harness connection point 140-1 to top side conductive pad 132. As such, wire harness connection point 140-1 provides a point to connect a wire harness to apply positive voltage to top piezo assembly 107. A second conductive trace 222 within flexible coupling assembly 116 electrically connects wire harness connection point 140-3 to top side conductive pad 134. As such, wire harness connection point 140-3 provides a point to connect a wire harness to apply positive voltage to lower piezo assembly 111. Because there is electrical isolation between the conductive traces 220 and 222, different positive voltages can be applied to the upper and lower piezo assemblies 107 and 111. The voltages supplied can be different depending on the desired loading. A third conductive trace 224 within flexible coupling assembly 116 electrically connects wire harness connection point 140-2 to each of the backside conductive pads 136, as well as conductive pad 138. As such, wire harness connection point 140-2 provides a common point for connecting a wire harness electrically that is coupled to the negative polarity side of piezo 108 (via backside conductive pads 136) as well as the negative polarity sides of piezo 110, 112 and 114 (via conductive pad 138 and pin 118). As such, they each will share the same voltage at any given time.

Figure 3:
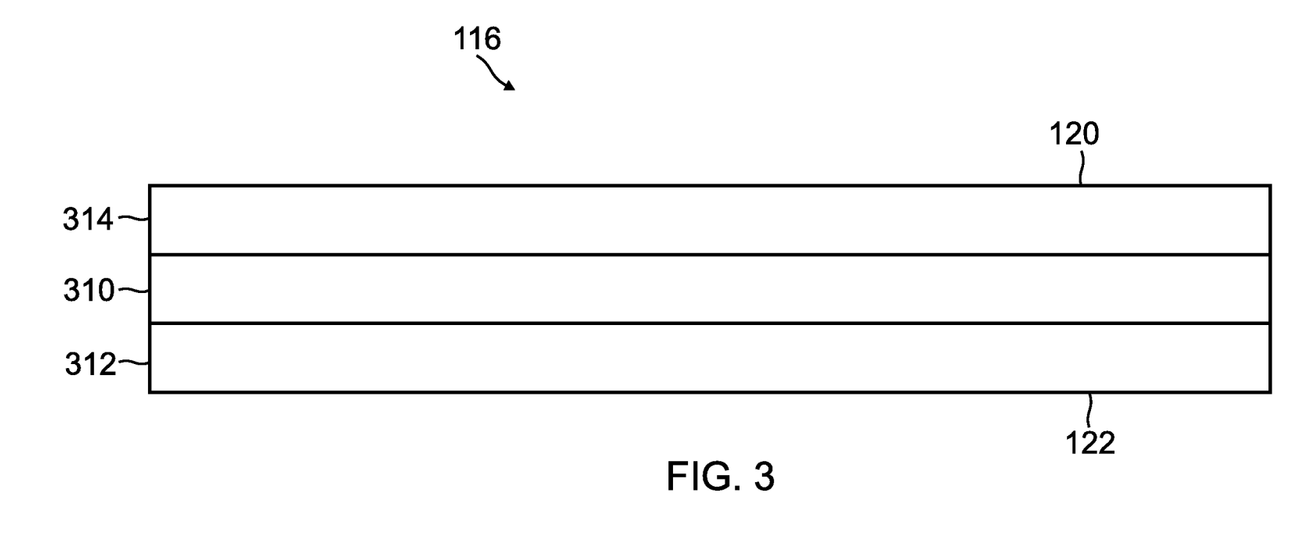
FIG. 3 is a diagram illustrating cross section of a flexible coupling assembly of one embodiment of the present disclosure.

In one embodiment, such as illustrated in the cross-sectional view shown in FIG. 3, flexible coupling assembly 116 comprises a multi-layer film. For example, in the embodiment shown in FIG. 3, flexible coupling assembly 116 comprises a conductive layer 310 sandwiched between two or more polyimide film cover layers 312, 314. The polyimide film may comprise a material such as Kapton. The conductive layer 310 is etched (or otherwise deposited as a pattern) to form the conductive traces 220, 222, 224 shown in FIG. 2C. In one embodiment, conductive layer 310 comprises a copper sheet or may comprise another conductive metal or alloy. In one embodiment, where cover layer 312 defines the back side 122 of flexible coupling assembly 116, regions of the cover layer 312 material are removed over portions of conductive trace 224 to expose a region for conductive pads 136. These regions are filled in with a conductive metallic material (such as copper, for example) to form backside conductive pads 136. Similarly, where cover layer 314 defines the top side 120 of flexible coupling assembly 116, regions of the cover layer 314 material are removed over portions of traces 220 and 222 to expose regions for conductive pads 132 and 134. These regions can then be filled in with a conductive metallic material (such a copper, for example) to form front side conductive pads 132 and 134. Finally, a region of cover layer 314 material around center hole 202 is removed over trace 224 to form conductive pad 138 and filled in with a conductive metallic material (such a copper, for example). One or more of the conductive pads 132, 134, 136 or 138 may also be plated with a material such as gold. This plating may result in the conductive pads having a thickness greater than that of cover layers 312 and/or 314 and therefore have a surface that extends out from the surface of these cover layers. In one embodiment, each of the wire harness connection points 140-1, 140-2 and 140-3 comprise thru-holes that penetrate flexible coupling assembly 116 so that wires of the wiring harness (which may itself comprise a flexible tape material) can be fed through the respective connection points and soldered down.

As already mentioned above, flexible coupling assembly 116 is both mechanically and electrically coupled to the piezo 108 by the semi-rigid conductive adhesive 126 applied between the backside conductive pads 136 and the negative side of piezo 108. Utilization of the semi-rigid conductive adhesive 126 together with the design of flexible coupling assembly 116 avoids any need to separately solder wire connections between pin 118 and piezo 108 reducing the susceptibility of fracturing the top piezo 108 during thermal cycling, as compared to prior designs.

The semi-rigid conductive adhesive 126 needs to be both conductive, in order to provide electrical coupling between flexible coupling assembly 116 and top piezo 108, and able to withstand the thermal cycling demands expected of a ring laser gyroscope. In one embodiment, the material used for semi-rigid conductive adhesive 126 comprises a non-conductive semi-rigid adhesive material doped with silver balls, or other metallic materials, to make it conductive. For example, in one embodiment, the base semi-rigid adhesive used is the commercially available Honeywell adhesive 8239-03 (e.g., 3M Scotchweld 2216 B/A Gray), which has been shown to survive the thermal cycling demands through experimentation, but is not electrically conductive. This adhesive is doped with silver balls to make it conductive.

For example, in one embodiment, the semi-rigid adhesive is doped with 5-15% silver balls, having an average diameter of 0.002 inches, to form semi-rigid conductive adhesive 126.

Figure 4:
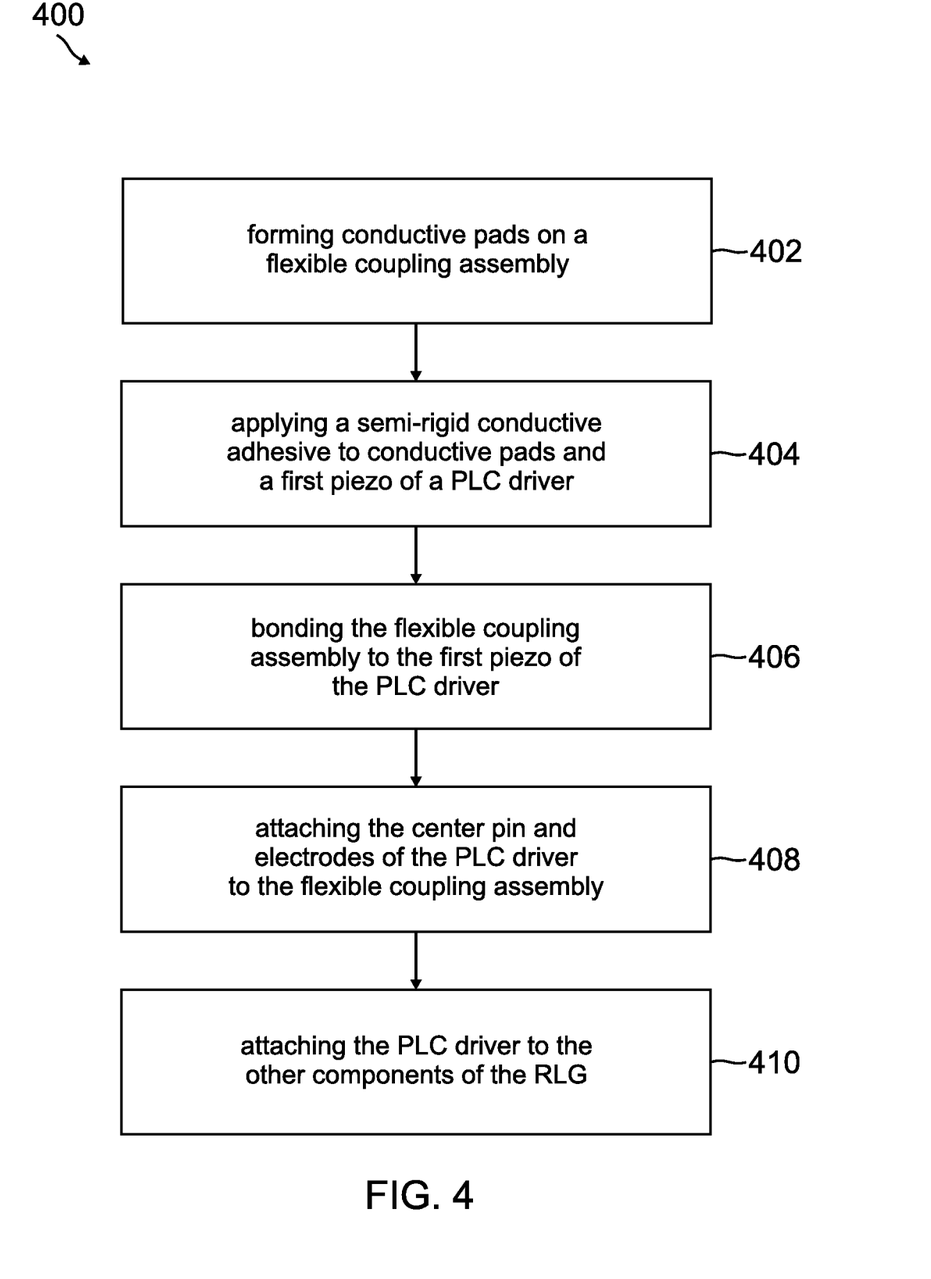
FIG. 4 is a flow chart illustrating a method of one embodiment of the present disclosure.

FIG. 4 is a flow chart illustrating a method 400 for fabricating a ring laser gyroscope. The method begins at 402 with forming conductive pads on a flexible coupling assembly. As discussed above with respect to FIG. 3, the conductive pads can be formed by removing regions of the cover layer of the flexible coupling assembly and filling the regions with a conductive metallic material. The conductive pads are formed on both the sides of the flexible coupling assembly.

The method proceeds to 404 with applying a semi-rigid conductive adhesive to the conductive pads and the top piezo of a PLC driver. As discussed above with respect to FIG. 3, the semi-rigid conductive adhesive is only applied to the conductive pads on the backside of the flexible coupling assembly. Both the conductive pads and the top piezo of the PLC driver are sterilized (with alcohol, for example) before the semi-rigid conductive adhesive is applied. In one embodiment, the semi-rigid conductive adhesive is applied using a power syringe. In additional embodiments, other known methods of applying adhesives are used.

The method proceeds to 406 with bonding the flexible coupling assembly to the top piezo. After the semi-rigid conductive adhesive is applied to the conductive pads and the top piezo, the flexible coupling assembly and top piezo are placed in a bonding fixture and the combination is cured. In one embodiment, the combination of the flexible coupling assembly and the first piezo are cured at 250° F. In one embodiment, approximately five pounds of pressure is applied by the bonding fixture to the combination during curing.

The method proceeds to 408 with attaching the center pin and electrodes of the PLC driver to the flexible coupling assembly. The center pin extends through the hole in the upper piezo assembly and the flexible coupling assembly. In one embodiment, the center pin is soldered to a conductive pad on the first side of the flexible coupling assembly. The electrodes that provide an electrical connection with the positive polarity sides of the piezos are folded over the conductive pads on the first side of the flexible coupling assembly. In one embodiment, the electrodes are soldered to the conductive pads on the first side of the flexible coupling assembly.

The method proceeds to 410 with attaching the other ring laser gyroscope components to the PLC driver. The additional components of the ring laser gyroscope include a transducer mirror and a laser block assembly. In one embodiment, the transducer mirror is bonded to the baseplate of the PLC driver with an epoxy. The laser block assembly includes a wiring harness and the wires are fed through the thru-holes of the connection points of the PLC driver. In one embodiment, the wires are soldered to the PLC driver.

Figure 5:
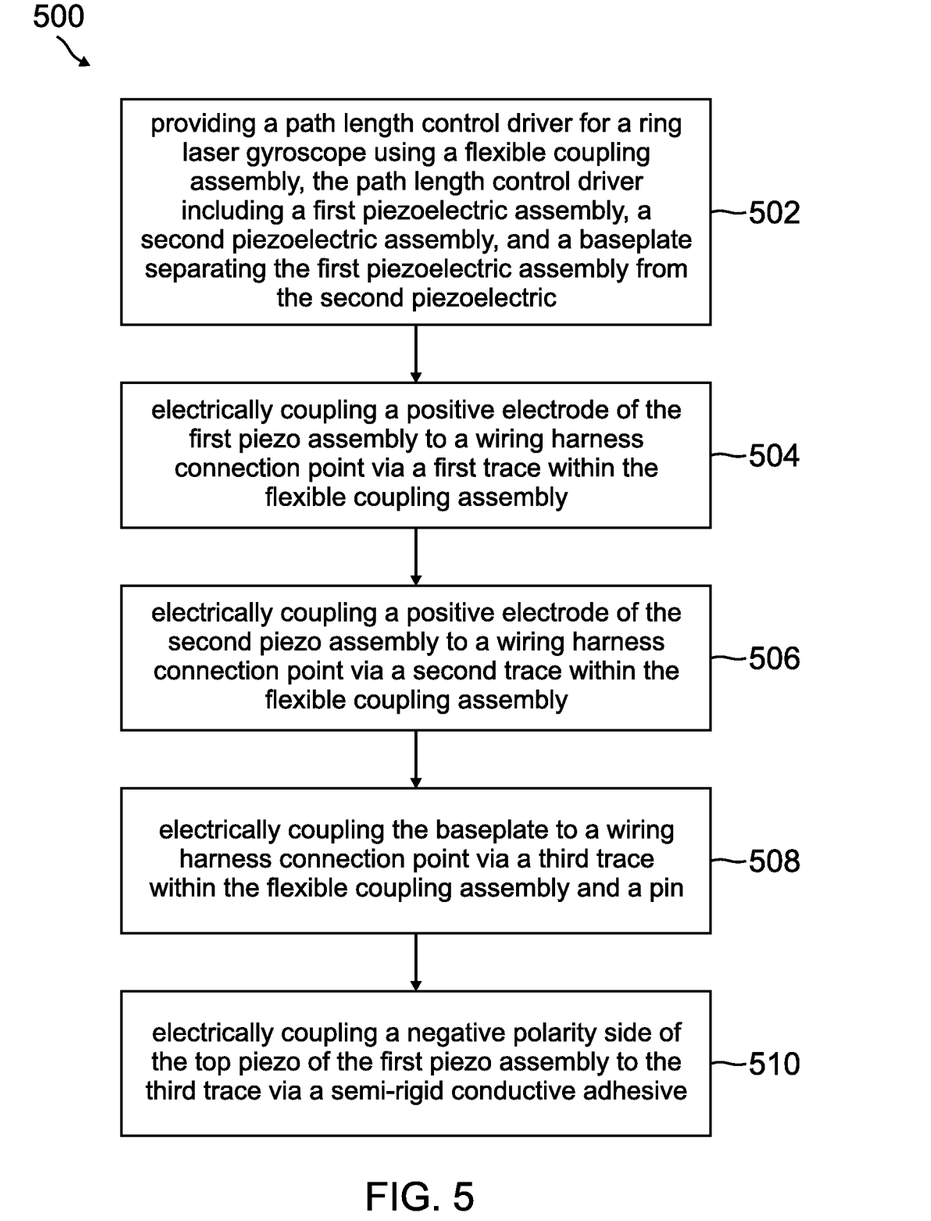
FIG. 5 is a flow chart illustrating a method of one embodiment of the present disclosure.

FIG. 5 is a flow chart illustrating a method 500 for using a flexible coupling assembly, such as flexible coupling assembly 116, in a ring laser gyroscope. The method begins at 502 with providing a PLC driver including: a first piezo assembly, a second piezo assembly, and a baseplate that separates the first and second piezo assemblies. The flexible coupling assembly is positioned on the top piezo of the first piezo assembly. In one embodiment, the method 500 may be implemented using a flexible coupling assembly together with a PLC driver such as PLC driver 100 discussed above.

The method proceeds to 504 with electrically coupling a positive electrode of the first piezo assembly to a wire harness connection point via a first trace within the flexible coupling assembly. In one embodiment, the positive electrode is electrically coupled to the first trace via a first front side conductive pad on the flexible coupling assembly and is soldered to the first front side conductive pad.

The method proceeds to 506 with electrically coupling a positive electrode of the second piezo assembly to a wire harness connection point via a second trace within the flexible coupling assembly. In one embodiment, the positive electrode is electrically coupled to the second trace via a second front side conductive pad on the flexible coupling assembly and is soldered to the second front side conductive pad.

The method proceeds to 508 with electrically coupling the baseplate to a wire harness connection point via a third trace within the flexible coupling assembly. The baseplate is electrically coupled to the third trace through a pin that extends from the baseplate through the first piezo assembly and the flexible coupling assembly. The pin is soldered to a third front side conductive pad on the flexible coupling assembly.

The method proceeds to 510 with electrically coupling a negative polarity side of the top piezo of the first piezo assembly to the third trace within the flexible coupling assembly via a semi-rigid conductive adhesive, such as semi-rigid conductive adhesive 126. In one embodiment, a plurality of backside conductive pads on the flexible coupling assembly are bonded to the negative polarity side of the top piezo with the semi-rigid conductive adhesive.

The use of the flexible coupling assembly 116 with semi-rigid conductive adhesive 126, provides a significant increase in the performance of PLC drivers and avoids fracturing of the top piezo from thermal cycling. This advancement provides greater longevity and accuracy to the PLC driver during its life.

EXAMPLE EMBODIMENTS

Example 1 includes a path length control driver of a ring laser gyroscope comprising: a first piezoelectric assembly, wherein the first piezoelectric element assembly includes a first piezoelectric element, a second piezoelectric element, and a first electrode electrically coupled to a positive polarity side of the first piezoelectric element and the second piezoelectric element; a second piezoelectric assembly, wherein the second piezoelectric assembly includes a third piezoelectric element, a fourth piezoelectric element, and a second electrode electrically coupled to a positive polarity side of the third piezoelectric element and the fourth piezoelectric element a baseplate positioned between the first piezoelectric assembly and the second piezoelectric assembly, the baseplate including a pin extending through the first piezoelectric assembly; and a flexible coupling assembly that electrically couples the first electrode to a first wire harness connection point, electrically couples the second electrode to a second wire harness connection point, and electrically couples the pin to a third wire harness connection point; wherein the flexible coupling assembly is bonded to a negative polarity side of the first piezoelectric element of the first piezoelectric assembly by a semi-rigid conductive adhesive that electrically couples the negative polarity side of the first piezoelectric element to the pin.

Example 2 includes the path length control driver of Example 1, wherein semi-rigid conductive adhesive comprises a non-conductive, semi-rigid adhesive that is doped with 5-15% silver balls.

Example 3 includes the path length control driver of any of Examples 1-2, wherein the flexible coupling assembly wherein the flexible coupling assembly comprises a conductive layer positioned between two or more polyimide film cover layers.

Example 4 includes the path length control driver of Example 3, wherein the polyimide film comprises Kapton.

Example 5 includes the path length control driver of any of Examples 3-4, wherein the conductive layer includes: a first trace electrically coupled to the first electrode and the first wire harness connection point; a second trace electrically coupled to the second electrode and to the second wire harness connection point; a third trace electrically coupled to the pin and to the third wire harness connection point.

Example 6 includes the path length control driver of Example 5, the flexible coupling assembly further comprising a plurality of backside conductive pads electrically coupled to the third trace, wherein the plurality of backside conductive pads are bonded to the negative polarity side of the first piezoelectric element by the semi-rigid conductive adhesive.

Example 7 includes the path length control driver of any of Examples 5-6, the flexible coupling assembly further comprising a front side conductive pad electrically coupled to the third trace, and wherein the pin is soldered to the front side conductive pad.

Example 8 includes a flexible coupling assembly for a path length control driver of a ring laser gyroscope, the flexible coupling assembly comprising: two or more polyimide film cover layers; a conductive layer positioned between the two or more polyimide film cover layers; a center hole; a plurality of thru-holes; a plurality of backside conductive pads electrically coupled to the conductive layer; a plurality of front side conductive pads electrically coupled to the conductive layer; and a plurality of embedded traces in the conductive layer that electrically couple the plurality of front side conductive pads and the plurality of backside conductive pads to components of the path length control driver.

Example 9 includes the flexible coupling assembly of Example 8, wherein the embedded traces include: a first trace electrically coupled to a first conductive pad of the plurality of front side conductive pads; a second trace electrically coupled to a second conductive pad of the plurality of front side conductive pads; and a third trace electrically coupled to the plurality of backside conductive pads and to a third conductive pad of the plurality of front side conductive pads.

Example 10 includes the flexible coupling assembly of Example 9, wherein the first conductive pad of the plurality of front side conductive pads and the second conductive pad of the plurality of front side conductive pads are positioned on opposing sides of the flexible coupling assembly, and wherein the third conductive pad of the plurality of front side conductive pads surrounds the center hole.

Example 11 includes the flexible coupling assembly of any of Examples 8-10, wherein the plurality of front side conductive pads and the plurality of backside conductive pads comprise conductive metallic material deposited in an area where the cover layer is removed.

Example 12 includes the flexible coupling assembly of any of Examples 8-11, wherein the plurality of front side conductive pads and the plurality of backside conductive pads are plated with a metallic material to extend the surface of the conductive pads beyond the surface of the two or more cover layers.

Example 13 includes the flexible coupling assembly of any of Examples 8-12, wherein the flexible coupling assembly is predominantly circular and such a size that will cover a top surface of a first piezoelectric element of the path length control driver.

Example 14 includes the flexible coupling assembly of any of Examples 8-13, wherein the plurality of backside conductive pads are electrically coupled together to maintain a consistent voltage to all of the backside conductive pads.

Example 15 includes a method for a path length control driver for a ring laser gyroscope using a flexible coupling assembly, the path length control driver including a first piezoelectric assembly, a second piezoelectric assembly, and a baseplate separating the first piezoelectric assembly from the second piezoelectric assembly, the method comprising: electrically coupling a positive electrode of the first piezoelectric assembly to a first wire harness connection point via a first trace within a flexible coupling assembly; electrically coupling a positive electrode of the second piezoelectric assembly to a second wire harness connection point via a second trace within the flexible coupling assembly; electrically coupling the baseplate to a third wire harness connection point via a third trace within the flexible coupling assembly, wherein the baseplate is electrically coupled to the third trace by a pin that extends through both the first piezoelectric assembly and the flexible coupling assembly; and electrically coupling a negative polarity side of a first piezoelectric element of the first piezoelectric assembly to the third trace within the flexible coupling assembly via a semi-rigid conductive adhesive.

Example 16 includes the method of Example 15, wherein semi-rigid conductive adhesive comprises a non-conductive, semi-rigid adhesive that is doped with 5-15% silver balls.

Example 17 includes the method of any of Examples 15-16, wherein electrically coupling the negative polarity side of the first piezoelectric element of the first piezoelectric assembly to the third trace further comprises bonding a plurality of backside conductive pads on the flexible coupling assembly the negative polarity side of the first piezoelectric element.

Example 18 includes the method of any of Examples 15-17, wherein electrically coupling the baseplate to a third wire harness connection point further comprises soldering the pin to a front side conductive pad on the flexible coupling assembly.

Example 19 includes the method of any of Examples 15-18, wherein the flexible coupling assembly comprises a conductive layer positioned between two or more polyimide film cover layers, and wherein the first trace, the second trace and the third trace are provided within the conductive layer.

Example 20 includes the method of Example 19, wherein the flexible coupling assembly comprises conductive pads electrically coupled to the first trace, the second trace and the third trace, the conductive pads provided where portions of the polyimide film cover layers have been removed and replaced by conductive metallic material.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A path length control driver of a ring laser gyroscope comprising:
   a first piezoelectric assembly, wherein the first piezoelectric element assembly includes a first piezoelectric element, a second piezoelectric element, and a first electrode electrically coupled to a positive polarity side of the first piezoelectric element and the second piezoelectric element;
   a second piezoelectric assembly, wherein the second piezoelectric assembly includes a third piezoelectric element, a fourth piezoelectric element, and a second electrode electrically coupled to a positive polarity side of the third piezoelectric element and the fourth piezoelectric element;
   a baseplate positioned between the first piezoelectric assembly and the second piezoelectric assembly, the baseplate including a pin extending through the first piezoelectric assembly; and
   a flexible coupling assembly that electrically couples the first electrode to a first wire harness connection point, electrically couples the second electrode to a second wire harness connection point, and electrically couples the pin to a third wire harness connection point;
   wherein the flexible coupling assembly is bonded to a negative polarity side of the first piezoelectric element of the first piezoelectric assembly by a semi-rigid conductive adhesive that electrically couples the negative polarity side of the first piezoelectric element to the pin.

2. The path length control driver of claim 1, wherein semi-rigid conductive adhesive comprises a non-conductive, semi-rigid adhesive that is doped with 5-15% silver balls.

3. The path length control driver of claim 1, wherein the flexible coupling assembly comprises a conductive layer positioned between two or more polyimide film cover layers.

4. The path length control driver of claim 3, wherein the polyimide film comprises Kapton.

5. The path length control driver of claim 3, wherein the conductive layer includes:
   a first trace electrically coupled to the first electrode and the first wire harness connection point;
   a second trace electrically coupled to the second electrode and to the second wire harness connection point; and
   a third trace electrically coupled to the pin and to the third wire harness connection point.

6. The path length control driver of claim 5, the flexible coupling assembly further comprising a plurality of backside conductive pads electrically coupled to the third trace, wherein the plurality of backside conductive pads are bonded to the negative polarity side of the first piezoelectric element by the semi-rigid conductive adhesive.

7. The path length control driver of claim 5, the flexible coupling assembly further comprising a front side conductive pad electrically coupled to the third trace, and wherein the pin is soldered to the front side conductive pad.

8. A flexible coupling assembly for a path length control driver of a ring laser gyroscope, the flexible coupling assembly comprising:
   two or more polyimide film cover layers;
   a conductive layer positioned between the two or more polyimide film cover layers;
   a center hole;
   a plurality of thru-holes;
   a plurality of backside conductive pads electrically coupled to the conductive layer;
   a plurality of front side conductive pads electrically coupled to the conductive layer; and
   a plurality of embedded traces in the conductive layer that electrically couple the plurality of front side conductive pads and the plurality of backside conductive pads to components of the path length control driver.

9. The flexible coupling assembly of claim 8, wherein the embedded traces include:
   a first trace electrically coupled to a first conductive pad of the plurality of front side conductive pads;
   a second trace electrically coupled to a second conductive pad of the plurality of front side conductive pads; and
   a third trace electrically coupled to the plurality of backside conductive pads and to a third conductive pad of the plurality of front side conductive pads.

10. The flexible coupling assembly of claim 9, wherein the first conductive pad of the plurality of front side conductive pads and the second conductive pad of the plurality of front side conductive pads are positioned on opposing sides of the flexible coupling assembly, and wherein the third conductive pad of the plurality of front side conductive pads surrounds the center hole.

11. The flexible coupling assembly of claim 8, wherein the plurality of front side conductive pads and the plurality of backside conductive pads comprise conductive metallic material deposited in an area where the cover layer is removed.

12. The flexible coupling assembly of claim 8, wherein the plurality of front side conductive pads and the plurality of backside conductive pads are plated with a metallic material to extend the surface of the conductive pads beyond the surface of the two or more cover layers.

13. The flexible coupling assembly of claim 8, wherein the flexible coupling assembly is predominantly circular and such a size that will cover a top surface of a first piezoelectric element of the path length control driver.

14. The flexible coupling assembly of claim 8, wherein the plurality of backside conductive pads are electrically coupled together to maintain a consistent voltage to all of the backside conductive pads.

* * * * *